(12) United States Patent
Nagao et al.

(10) Patent No.: US 7,996,658 B2
(45) Date of Patent: Aug. 9, 2011

(54) PROCESSOR SYSTEM AND METHOD FOR MONITORING PERFORMANCE OF A SELECTED TASK AMONG A PLURALITY OF TASKS

(75) Inventors: Tsuyoshi Nagao, Kanagawa (JP); Hitoshi Suzuki, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 218 days.

(21) Appl. No.: 11/737,039

(22) Filed: Apr. 18, 2007

(65) Prior Publication Data

US 2007/0277178 A1    Nov. 29, 2007

(30) Foreign Application Priority Data

May 10, 2006    (JP) .................................. 2006-131246

(51) Int. Cl.
*G06F 9/00*    (2006.01)

(52) U.S. Cl. ...................................................... 712/227
(58) Field of Classification Search .................. 712/227, 712/228
See application file for complete search history.

(56) References Cited

U.S. PATENT DOCUMENTS

| 5,657,253 | A  | * | 8/1997  | Dreyer et al. ................. 702/186 |
| 5,835,705 | A  | * | 11/1998 | Larsen et al. ................. 714/47.1 |
| 6,098,169 | A  | * | 8/2000  | Ranganathan ................. 712/227 |
| 7,401,206 | B2 | * | 7/2008  | Hetherington et al. ....... 712/214 |
| 7,441,242 | B2 | * | 10/2008 | Barsness et al. ............. 718/104 |
| 7,448,025 | B2 | * | 11/2008 | Kalafatis et al. ............. 717/128 |
| 2005/0183065 | A1 | * | 8/2005 | Wolczko et al. ............. 717/124 |

FOREIGN PATENT DOCUMENTS

JP    5-151004 A    6/1993

OTHER PUBLICATIONS

Zagha, Marco, Larson, Brond, Turner, Steve, Itzkowitz, Marty. "Performance Analysis using the MIPS R10000 Performance Counters" Proceedings of the 1996 ACM/IEEE conference on Supercomputing.*

* cited by examiner

*Primary Examiner* — Jacob Petranek
(74) *Attorney, Agent, or Firm* — Sughrue Mion, PLLC (57)    ABSTRACT

A processor system includes a processor to execute a plurality of tasks by switching to one another, a task ID storage section to store a task ID to identify a task executed in the processor, an evaluation ID storage section to store an evaluation ID to be compared with an at least partial area of the task ID, a counter to measure a performance measurement value of a task executed in the processor, and a matching section to check a task ID stored in the task ID storage section against an evaluation ID stored in the evaluation ID storage section and operate the counter in accordance with a check result.

10 Claims, 5 Drawing Sheets

PROCESSOR SYSTEM AND METHOD FOR MONITORING PERFORMANCE OF A SELECTED TASK AMONG A PLURALITY OF TASKS

BACKGROUND OF THE INVENTION

1. Field of the Invention

The present invention relates to a processor system that incorporates multitasking and, particularly, to a performance measurement method for a processor system that incorporates multitasking.

2. Description of Related Art

A processor system, which is incorporated in transportation equipment such as motor vehicles and airplanes and communication devices such as mobile phones and switchboards, is called an embedded system. The embedded system generally provides a multitasking environment for the purposes of shortening a processing time, ensuring real-time execution, improving productivity through the representation of program software as components, and so on. The multitasking environment indicates an environment that looks as if a plurality of programs are executed in parallel by way of periodically switching the program which is divided into units that are executable in parallel or by switching the program to be executed upon the occurrence of a certain event. The task means a program unit which is executed in parallel in the multitasking environment. The multitasking is implemented by a CPU and a system program which carries out scheduling of a task that is executed by the CPU.

There is a known processor system that is capable of acquiring performance information such as task execution time. The acquired performance information is used for debugging of a user program which is executed in a processor system. For example, in a processor system which is disclosed in Japanese Unexamined Patent Application Publication No. 5-151004, a task ID which is preallocated to each task is written to a particular register upon switching of an execution task in a CPU. Further, a counter is incremented in synchronization with rewriting of the particular register, thereby measuring an execution time of each task.

Recently, as embedded devices to be controlled by an embedded system become more functional and complex, a user program to be executed in the embedded system is increasing in size. In this background, it is required to acquire performance information such as an execution time in units of task groups rather than in units of individual tasks which form a user program. For example, if the number of tasks which form a user program is large, a single function is implemented by a plurality of tasks in most cases. Therefore, it is sometimes necessary to evaluate the performance information of a task group as a whole for implementing the function rather than the performance information of each task. Further, in many cases, a user program is developed by division of labor, and it is required to acquire performance information in units of task groups which are developed by the same development team and evaluate the acquired performance information. In the following description, a task group refers to a collection of tasks to which one or a plurality of tasks belong(s).

The processor system as disclosed in Japanese Unexamined Patent Application Publication No. 5-151004 acquires performance information in units of individual tasks. It thus requires an additional process such as integration of the performance information which has been acquired in units of tasks in order to evaluate the performance in units of task groups.

As described above, the known processor system that incorporates multitasking acquires task performance information in units of individual tasks and is thus not suited to acquire performance information in units of task groups.

SUMMARY OF THE INVENTION

According to a first aspect of the present invention, there is provided a processor system including a processor to execute a plurality of tasks by switching to one another, a task ID storage section to store a task ID to identify a task executed in the processor, an evaluation ID storage section to store an evaluation ID to be compared with an at least partial area of the task ID, a counter to measure a performance measurement value of a task executed in the processor, and a matching section to check a task ID stored in the task ID storage section against an evaluation ID stored in the evaluation ID storage section and operate the counter in accordance with a check result.

In this configuration, the processor system of the first aspect of the present invention can measure by a counter a performance measurement value of a plurality of tasks whose task IDs are at least partly in common with each other. It is thereby possible to carry out the performance measurement of a task group which has the attribute that at least one area of task IDs is in common.

According to a second aspect of the present invention, there is provided a processor system including a processor to execute a plurality of tasks by switching to one another, a task ID storage section to store a task ID to identify a task executed in the processor, and a performance measurement section to carry out performance measurement of a task executed in the processor, wherein the task ID includes a task group identification area to identify a task group to which a task belongs, the performance measurement section determines if a task executed in the processor belongs to a task group as a target of performance measurement by reference to a task group identification area of a task ID stored in the task ID storage section, and if the task executed in the processor is a target of performance measurement, the performance measurement section carries out performance measurement of the task.

In the processor system of the second aspect of the present invention, a task ID includes a task group identification area to thereby identify a task group to which a task executed in the processor belongs. It is thereby possible to carry out the performance measurement of the tasks which belong to a particular task group only.

According to a third aspect of the present invention, there is provided a performance measurement method in a processor system including a processor, a task ID storage section to store a task ID to identify a task executed in the processor, and a counter to measure a performance measurement value of a task executed in the processor, in which the task ID includes a task group identification area to identify a task group to which a task belongs. The method includes storing a task ID of a next task to be executed in the processor into the task ID storage section upon switching of a task executed in the processor, determining if a task executed in the processor belongs to a task group as a target of performance measurement by reference to a task group identification area of a task ID stored in the task ID storage section, and if the task executed in the processor is a target of performance measurement, measuring a performance measurement value of the task by the counter.

In the performance measurement method of the third aspect of the present invention, a task ID includes a task group identification area to thereby identify a task group to which a task executed in the processor belongs. It is thereby possible to carry out the performance measurement of the tasks which belong to a particular task group only.

The present invention can provide a processor system that is suited for performance measurement in units of task groups.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Exemplary embodiments of the present invention are described hereinafter in detail with reference to the drawings. In the description of the drawings, the same elements are denoted by the same reference symbols and redundant description is omitted according to need.

First Embodiment

Figure 1:
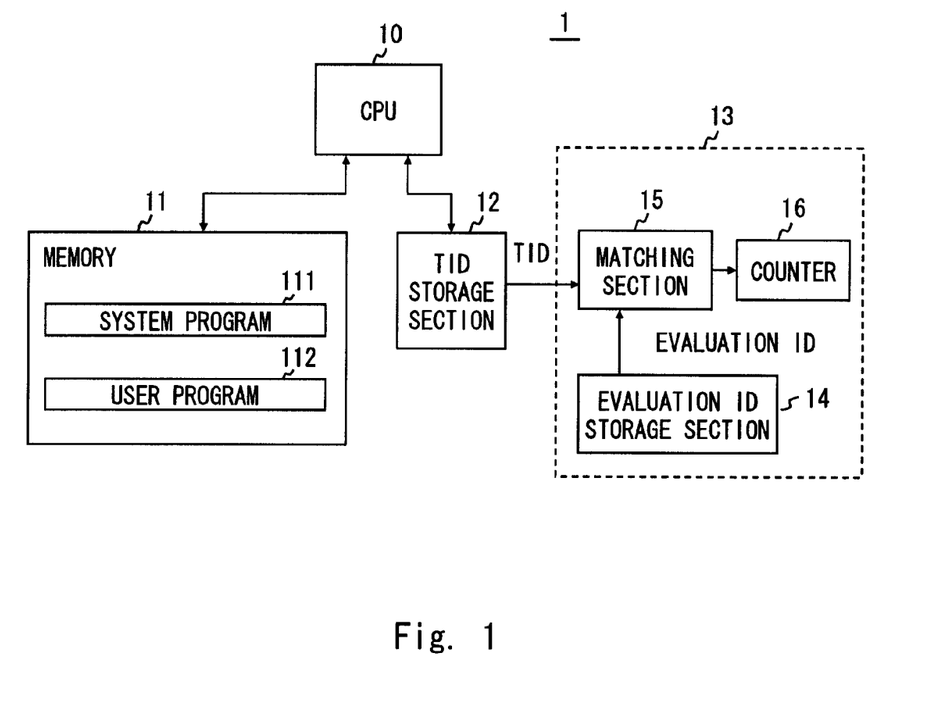
FIG. 1 is a block diagram showing a processor system according to a first embodiment of the present invention.

FIG. 1 shows the configuration of a processor system 1 according to an exemplary embodiment of the present invention. In FIG. 1, a CPU (Central Processing Unit) 10 executes a system program 111 and a user program 112, which are stored in a memory 11.

The memory 11 is used as a storage area of the system program 111 and the user program 112, which are read out and executed by the CPU 10, and also as a storage area of the data which is used in these programs. The memory 11 is a combination of RAM, ROM, flash memory and so on.

The system program 111 is a program that controls the entire processor system 1. The system program 111 carries out task management, memory management and so on for implementing multitasking by using hardware resources such as the CPU 10 and the memory 11. The task management is a process to control the generation, deletion, activation and termination of a task through management of task states, management of an execution sequence of executable tasks, management of priorities among tasks, retention and switching of context and so on.

The user program 112 is a program to deal with a user request. If the processor system 1 is incorporated in an embedded device, the user program 112 is a program to implement the function of the embedded device. One user program is composed of a plurality of tasks which are divided based on a difference in a hardware resource to use or time restriction. Although FIG. 1 illustrates only one user program 112 for the sake of simplification, the memory 11 actually stores a plurality of user programs for implementing various functions in the processor system 1. Each of a plurality of tasks which form a plurality of user programs including the user program 112 is executed in the multitasking environment that is provided by the CPU 10 and the system program 111.

A TID storage section 12 stores a task ID (TID), which is an identifier of a task that is being executed by the CPU 10. A TID contains information to identify a task group to which a task belong. As described earlier, the task group is a collection of one or a plurality of tasks. A TID is stored into the TID storage section 12 by the system program 111 which switches an execution task in response to the activation of a task.

Figure 2:
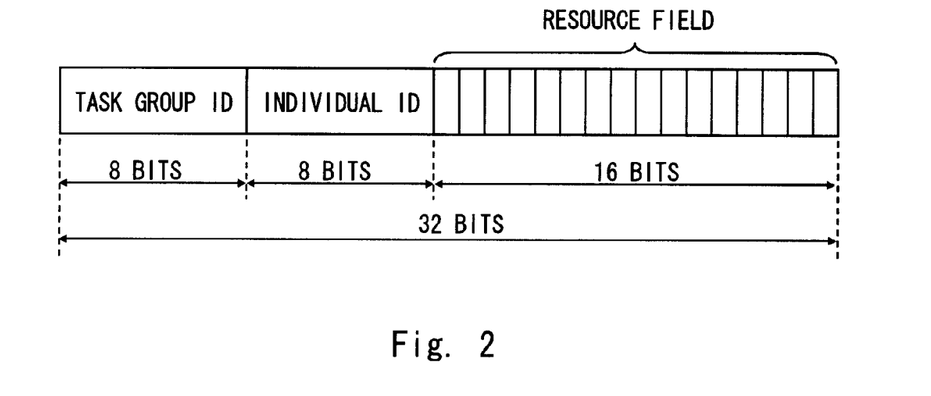
FIG. 2 is a view showing an example of a TID.

FIG. 2 shows an example of a TID. In the example of FIG. 2, a TID is 32-bit data as a whole. Specifically, 8 bits of the 32-bit data are defined as a task group ID, which indicates a task group to which a task belongs. Another 8 bits are defined as an individual ID, which distinguishes each task in the task group. The remaining 16 bits are defined as a resource field, which indicates a hardware resource used by a task. Each bit of the resource field and a hardware resource correspond one to one in such a way that a bit corresponding a hardware resource which is used by a task is set to "1" and a bit corresponding to a hardware resource which is not used by a task is set to "0". The task which uses a particular hardware resource can be thereby identified from the resource field. Therefore, the resource field serves as one of identifiers which are capable of identifying a task group, or a collection of tasks that use a particular hardware resource.

A performance measurement section 13 collects the performance information of a task which is executed by the CPU 10 in units of task groups. The performance measurement section 13 of this embodiment collects an execution time of a task in the CPU 10 in units of task groups, and it includes an evaluation ID storage section 14, a matching section 15 and a counter 16.

The evaluation ID storage section 14 stores an evaluation ID for designating a task group as the target of performance measurement by the performance measurement section 13. An evaluation ID is set to the evaluation ID storage section 14 prior to the execution of the user program 112 on the target of performance measurement according to an instruction by a user. Specifically, a debugger program (not shown) may be executed by the CPU 10 prior to the execution of the user program 112 on the target of performance measurement, for example, by inputting a designated value by a user through an input terminal (not shown) of the processor system 1 and storing an input value to the evaluation ID storage section 14.

The matching section 15 checks a TID which is stored in the TID storage section 12 against an evaluation ID which is stored in the evaluation ID storage section 14 to thereby determine if the task which is being executed by the CPU 10 belongs to a task group that is the target of collection of performance information (i.e. the target of measurement of a task execution time). If the running task is determined to belong to the task group that is the target of collection of performance information, the matching section 15 activates the counter 16 to measure a task execution time. The counter 16 retains a task execution time.

Figure 3:
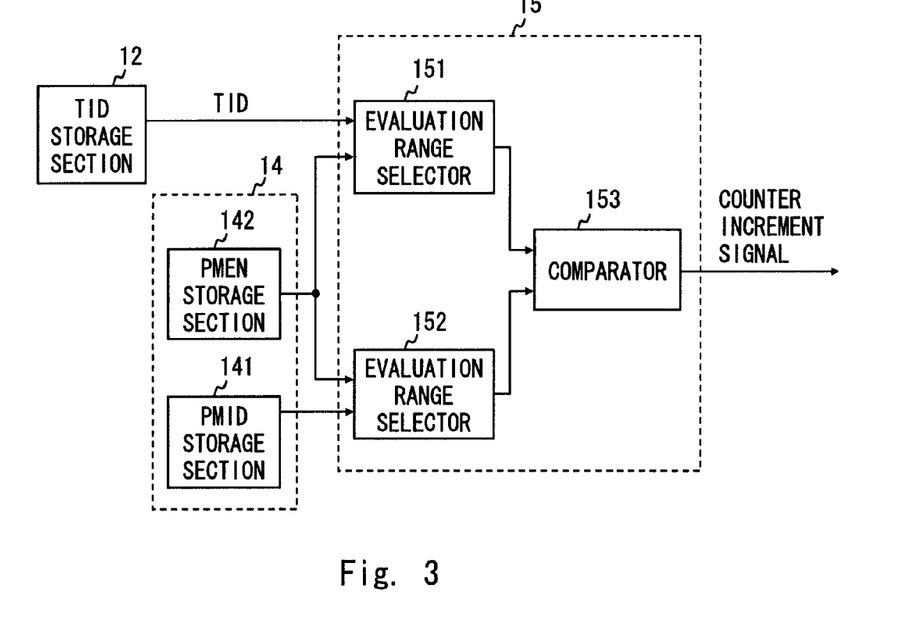
FIG. 3 is a block diagram showing a performance measurement section included in the processor system according to the first embodiment of the present invention.

An exemplary configuration and overall operation of the evaluation ID storage section 14 and the matching section 15, which are included in the performance measurement section 13, are described hereinafter with reference to FIGS. 3 and 4. FIG. 3 is a block diagram showing the configuration of the evaluation ID storage section 14 and the matching section 15. In FIG. 3, the evaluation ID storage section 14 includes a PMID storage section 141 and a PMEN storage section 142.

The PMID storage section 141 stores an entire TID which indicates a task group as the target of performance measurement. Specifically, the PMID storage section 141 stores a TID value, which represents an area for identifying a task group that is included in a TID as a value indicating a task group that is the target of performance measurement. In the following description, a value which is stored in the PMID storage section 141 is referred to as a matching identifier (PMID).

The PMEN storage section 142 stores a mask value (PMEN) for selecting a bit which is used to designate a task group that is the target of performance measurement out of the bits contained in TID and PMID. Therefore, The evaluation ID is designated by a PMID and a PMEN in the configuration of FIG. 3.

For example, if a TID is defined as shown in FIG. 2, a PMEN is set to "0xFF000000" in order to designate a task which has a particular task group ID as the target of performance measurement. "0x" indicates that the subsequent values are expressed in hexadecimal numbers. In order to designate a task which has a particular individual ID as the target of performance measurement, a PMEN is set to "0x00FF0000". In order to designate a task which uses a hardware resource that is associated with a head bit of a resource field, a PMEN is set to "0x00008000".

In FIG. 3, the matching section 15 includes evaluation range selectors 151 and 152 and a comparator 153. The evaluation range selector 151 receives a TID value which is stored in the TID storage section 12 and a PMEN value which is stored in the PMEN storage section 142 and specifies the range of a TID value to be evaluated in the comparator 153 in the subsequent stage. Specifically, a logical AND between the TID value and the PMEN value is calculated for each bit. For example, if a TID value is "0x8EAB0101" and a PMEN value is "0xFF000000", the evaluation range selector 151 outputs "0x8E000000".

The evaluation range selector 152 receives a PMID value which is stored in the PMID storage section 141 and a PMEN value which is stored in the PMEN storage section 142, carries out a logical AND between the TID value and the PMEN value for each bit, and outputs the calculation result. Thus, the evaluation range selector 152 specifies the range of a PMID value to be evaluated in the comparator 153 in the subsequent stage.

The comparator 153 receives the output values of the evaluation range selectors 151 and 152 and outputs a signal to increment the counter 16 if the output values match. For example, a counter increment signal may be a 1-bit signal and the counter 16 may be incremented if the value is "1".

The operation of the performance measurement section 13 having the configuration as shown in the block diagram of FIG. 1 is described hereinafter with reference to the flowchart of FIG. 4. In Step S101, the TID value which is stored in the TID storage section 12 and the PMID value which is stored in the PMID storage section 141 are read out by the evaluation range selectors 151 and 152.

In Step S102, masking operations between the TID value and the PMEN value and between the PMID value and the PMEN value are carried out in the evaluation range selectors 151 and 152, thereby determining the evaluation range of the TID value and the PMID value.

In Step S103, the output values of the evaluation range selectors 151 and 152 are compared in the comparator 153 to determine if the TID value and the PMID value match in the evaluation range. If these values match, the counter 16 is incremented in response to the output signal of the comparator 153 (Step S104).

Figure 4:
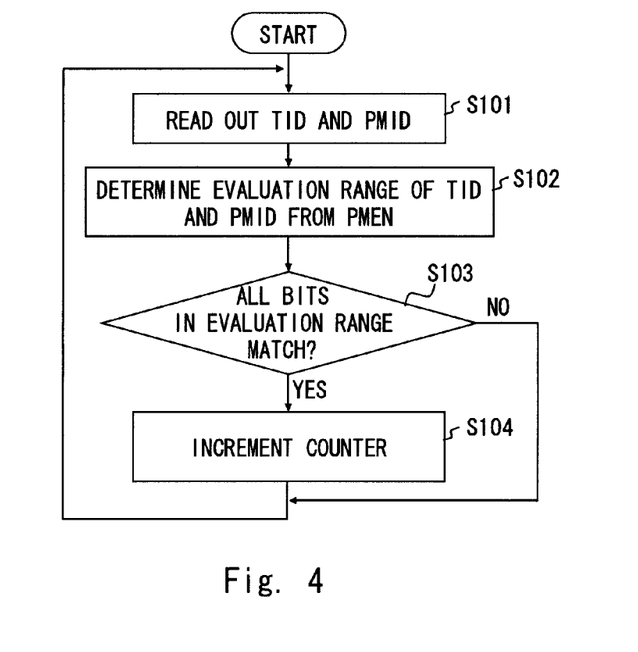
FIG. 4 is a flowchart showing the operation of the performance measurement section in the processor system according to the first embodiment of the present invention.

The process shown in the flowchart of FIG. 4 is repeated every clock cycle, and the number of clock cycles where the task group as the target of performance measurement is executed is stored in the counter 16. Therefore, the execution time in units of task groups can be measured by reading out the stored value of the counter 16.

Figure 5:
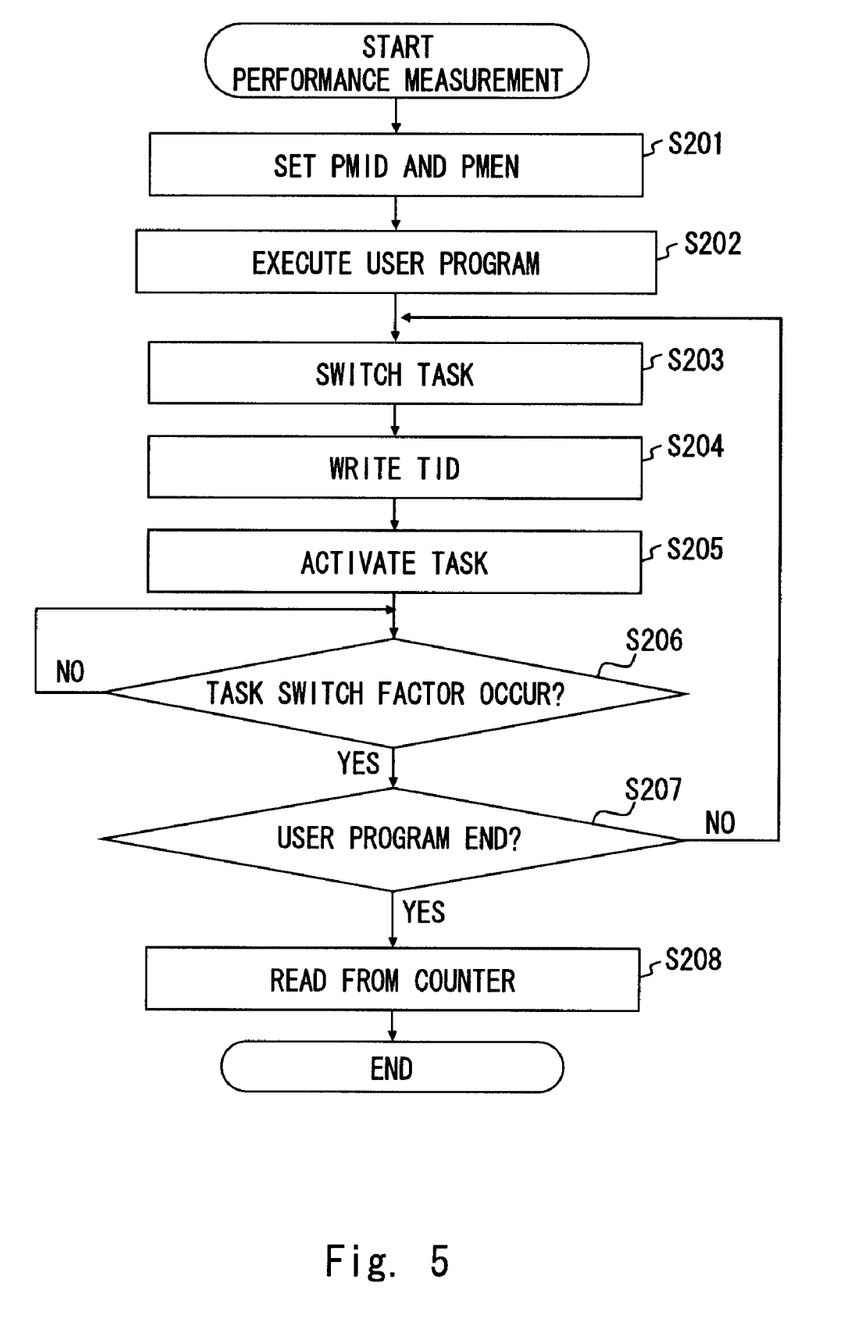
FIG. 5 is a flowchart showing performance measurement procedures in the processor system according to the first embodiment of the present invention.

An example of a whole procedure to carry out the performance measurement in the processor system 1 is described hereinafter with reference to the flowchart of FIG. 5. In Step S201, prior to the execution of the user program 112 which includes the task group as the target of performance measurement, a debugger program is activated to set a PMID and a PMEN corresponding to the measurement target task group. After that, the execution of the user program 112 is started in Step S202.

Steps 203 to S207 are the processes which are executed by the system program 111 that manages the execution of the user program 112.

In Step S203, a task switch process is executed upon the occurrence of an execution task switch factor. Specifically, the context of a task which is interrupted during execution is saved and the context of a task which is executed next is read out. In Step S204, the TID of the task which is executed next is written to the TID storage section 12.

In Step S205, the task which is ready for execution is started up. The running task is executed by the CPU 10 until a task switch factor occurs. Upon the occurrence of a task switch factor during the execution of a task, the process returns to the task switch process of Step S203 and repeats the subsequent process if the task switch factor does not indicate the termination of the task and the termination of the user program 112 (Steps S206 and S207). If, on the other hand, the task switch factor indicates the termination of the task and the termination of the user program 112, a debugger program is activated to read out the value of the counter 16 and the performance measurement process ends. In parallel with the process of Steps S202 to S207, the operation of FIG. 4 is executed in the performance measurement section 13.

As described above, the processor system 1 of this embodiment defines at least part of a TID, which is an identifier of a task, as identification information to designate a task group. Further, the performance measurement section 13 designates a task group that is the target of performance measurement by an evaluation ID and checks the evaluation ID against a TID of a task which is executed in the CPU 10, thereby selectively acquiring the performance information of a task which belongs to a particular task group. Such a configuration enables the acquirement of performance information such as a task execution time in the CPU 10 in units of task groups. This eliminates the need for an additional process such as integration of measurement results in units of individual tasks. Furthermore, because of the elimination of the performance measurement in units of individual tasks, it is possible to reduce a storage capacity required for performance measurement. The performance measurement of one task group only requires the operation of one performance measurement section 13 and the collection by one counter 16, and it does not require the counters 16 for each task.

Moreover, the processor system 1 can acquire the performance information of a given task group in one performance measurement section 13 by changing an evaluation ID for designating a task group as the target of performance measurement. In the configuration where one performance measurement section 13 acquires the performance information of a predetermined, fixed task group only, it is necessary to use a number of performance measurement sections 13, which causes an increase in hardware size. On the other hand, the processor system 1 can carry out the performance measurement on various task groups with a limited hardware resource.

Furthermore, the processor system 1 allows flexible setting of evaluation ID by designating an evaluation ID with a PMID and a PMEN. Specifically, it is possible to flexibly designate a bit of a TID which indicates a task group by changing a value to be stored in the PMEN storage section 142.

Second Embodiment

Figure 6:
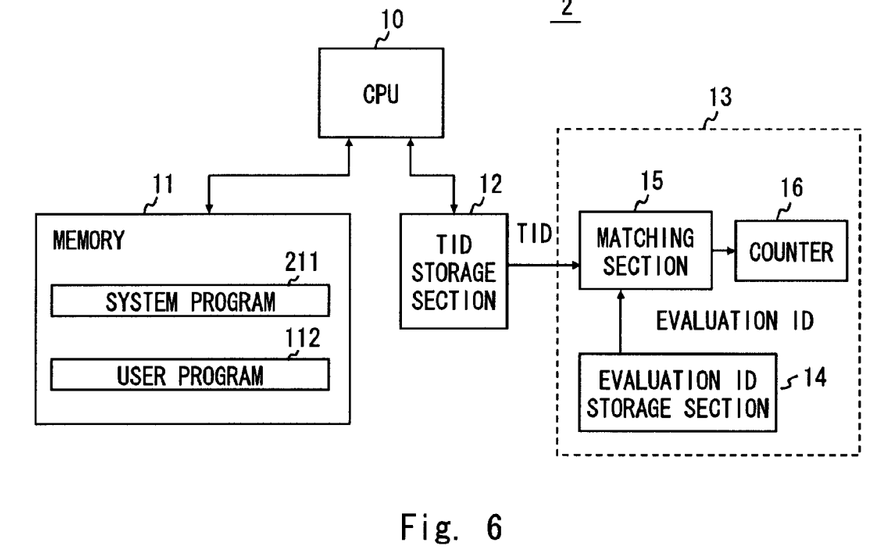
FIG. 6 is a block diagram showing a processor system according to a second embodiment of the present invention.

FIG. 6 shows the configuration of a processor system 2 according to another exemplary embodiment of the present invention. The processor system 2 is different from the processor system 1 in that it includes a system program 211 which is capable of dynamically determining a TID value to be stored in the TID storage section 12. The CPU 10, the memory 11, the TID storage section 12 and the performance measurement section 13 in the processor system 2 are the same as those in the processor system 1 and thus not described in detail herein.

The procedure of a task switch process which is executed by the system program 211 is described hereinafter with reference to the flowchart of FIG. 7. The task switch process shown in FIG. 7 corresponds to the process of Step S203 in FIG. 5, which is described in the first embodiment.

First, after the process returns to the system program 211 due to the occurrence of a task switch factor, a TID indicating the system program 211 is set to the TID storage section 12 (Step S301). Then, a next task to be executed by the CPU 10 is determined (Step S302). The selection of the next task to be executed may be made by selecting the highest priority task from executable tasks, for example.

In Step S303, it is determined whether or not the task which is selected as a task to be executed next is a common task. The common task refers to a task that is commonly called from a plurality of tasks which belong to different task groups. In this embodiment, such a common task does not belong to a particular task group but inherits the task group of a task that is a caller of the common task.

Specifically, if the task which is selected as a task to be executed next is a common task, the task group of a task that is a caller of the common task is determined as the task group of the common task (Step S304). For example, if a TID is defined to include a task group ID, an individual ID and a resource field, the task group ID of a caller task is allocated to the task group of a common task.

Figure 7:
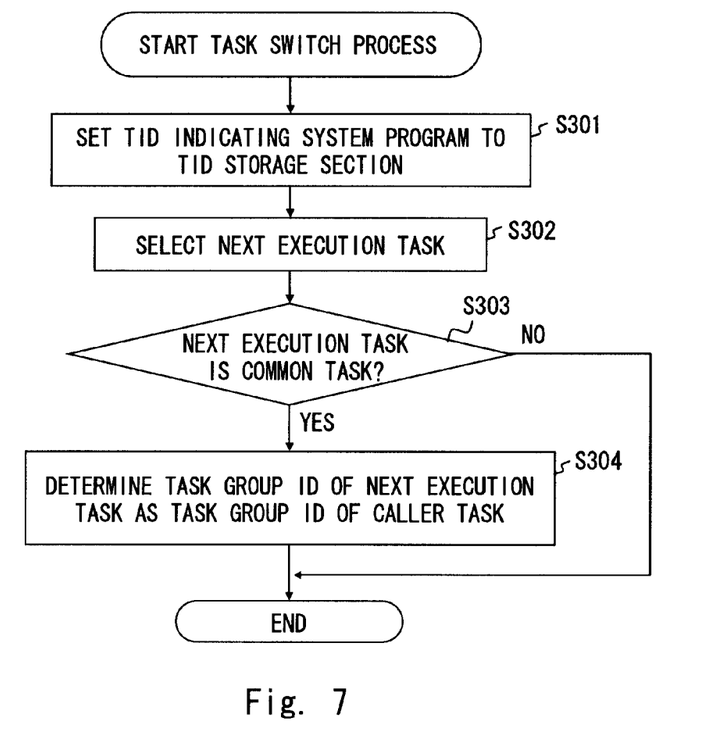
FIG. 7 is a flowchart showing a task switching process in the processor system according to the second embodiment of the present invention.

The process performed in the system program 211 is the same as that in the system program 111 of the first embodiment except for the task switch process shown in FIG. 7.

Advantages of determining a task group of a common task dynamically according to a caller task are as follows.

Figure 8A:
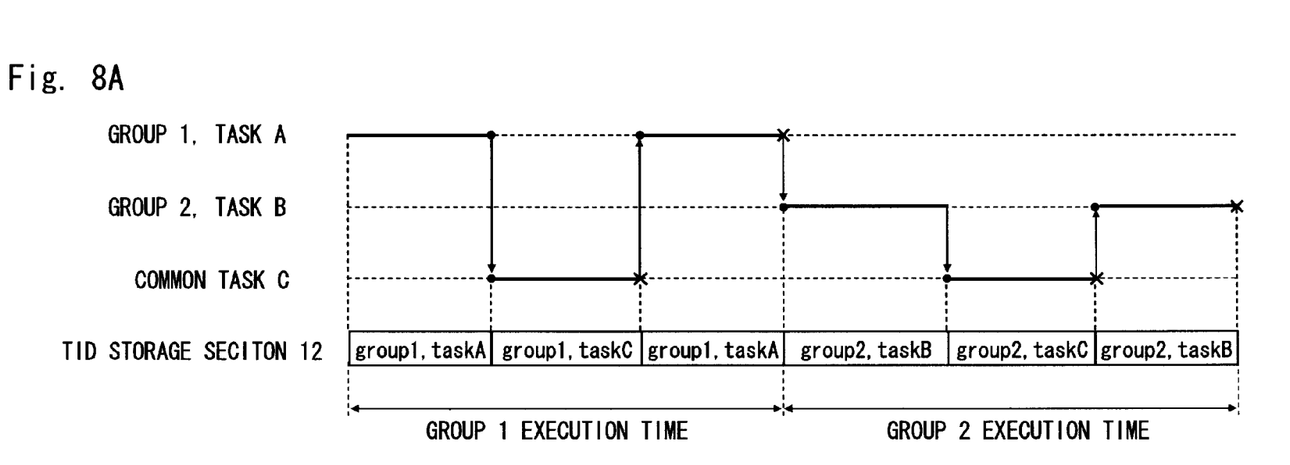
FIGS. 8A and 8B are view to describe the effect of dynamically changing a TID.
Figure 8B:
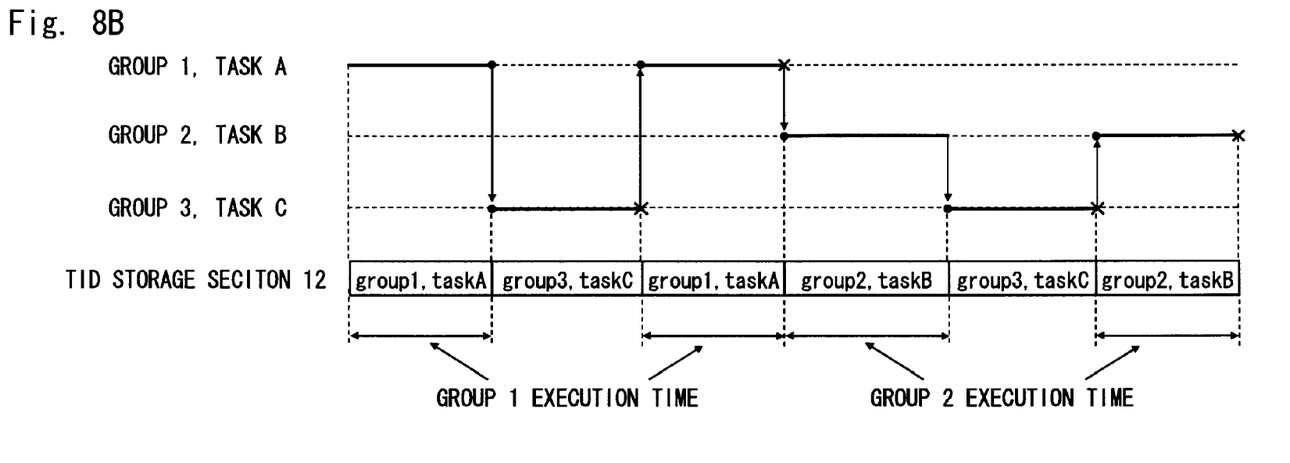

FIG. 8B shows the relationship between a value stored into the TID storage section 12 and an execution task in the processor system 1 of the first embodiment where each task belongs to a fixed task group and a fixed task group ID is allocated to each task. In the example of FIG. 8B, three tasks, A, B and C, are executed. A TID contains a task group ID and an individual ID. The task A belongs to a task group 1, the task B belongs to a task group 2, and the task C belongs to a task group 3 in fixed manner. The task C is a common task that is commonly called from the task A and the task B, which belong to different task groups.

If a task group is fixed, the execution time of the three tasks are measured as a execution time of a separate task group, and it is unable to measure the execution time of the called task C as a part of the execution time of the task A or B, which is a caller task. If the task C is defined to belong to a task group 1, for example, the execution time of the task C which is called by the task group B is measured as the execution time of the task group 1, which hinders accurate performance measurement.

On the other hand, in the processor system 2 of this embodiment, a task group to which the common task C belongs can be dynamically changed according to a caller task. It is thereby possible to measure the execution time of the common task C which is called by the task A as the execution time of the task group 1 and to measure the execution time of the common task C which is called by the task B as the execution time of the task group 2 as shown in FIG. 8A.

Other Embodiments

In the above-described first and second embodiments of the present invention, the processor system 1 and 2 include one performance measurement section 13. The processor systems 1 and 2, however, may include a plurality of performance measurement sections 13. Further, the performance information which is measured in the performance measurement section 13 is not limited to an execution time of a task. For example, it is possible to measure the number of memory accesses which occur during execution of a task, the number of occurrences of a particular command or the like. The performance measurement section 13 measures the number of occurrences of a particular event by using the counter 16, and it can count various events in the processor system, such as the number of task execution clocks and the number of memory accesses.

In the first and second embodiments of the present invention, one TID is allocated to one task, so that at least part of the area in a TID is used as an area to identify a task group. The present invention, however, has the same effect as long as an ID which can identify a task group to which a task belongs is allocated to each task, and it is possible to allocate a task group ID, an individual ID and a resource field as three different IDs to a task, for example. However, considering the affect to a known CPU architecture and system program, the configuration of the processor systems 1 and 2 described above, which is the configuration where a task group is indicated by a particular bit included in one TID and an evaluation target bit is designated in the performance measurement section 13, is preferred. In a known processor system that incorporates multitasking, task management uses a task ID indicating a task as described in Japanese Unexamined Patent Application Publication No. 5-151004. Therefore, with the use of the configuration of the processor systems 1 and 2, a known CPU architecture and system program is less affected upon implementation of the present invention.

It is apparent that the present invention is not limited to the above embodiment, but may be modified and changed without departing from the scope and spirit of the invention.

What is claimed is:

1. A processor system comprising:
   a processor which executes a plurality of tasks by switching to one another;

a first memory which stores a task ID identifying a task executed in the processor;
a second memory which stores an evaluation ID identifying a task of a measurement target;
a third memory which stores a mask value;
a matching unit coupled to the first, second and third memories; and
a counter which is coupled to the matching unit, and which counts in response to a signal output from the matching unit,
wherein the task ID and the evaluation ID include a task group ID, an individual ID and a resource field, respectively,
wherein the task group ID comprises an identifier indicating a collection of tasks, and specifies a task group to which the task corresponding to the task ID or the evaluation ID belongs,
wherein the individual ID distinguishes each task in the task group corresponding to the task ID or the evaluation ID,
wherein the resource field comprises an identifier indicating a particular hardware resource being used by the task corresponding to the task ID or the evaluation ID, and
wherein the matching unit determines each evaluation range of the task ID and the evaluation ID based on the mask value, and compares a portion of the task ID corresponding to the determined evaluation range with a portion of the evaluation ID corresponding to the determined evaluation range to generate the signal.

2. The processor system according to claim 1, wherein the matching unit comprises:
a first evaluation range selector which receives the task ID and the mask value, and which determines the evaluation range of the task ID based on the mask value to generate the task ID including a masked portion indicating out of the evaluation range;
a second evaluation range selector which receives the evaluation ID and the mask value, and determines the evaluation range of the evaluation ID based on the mask value to generate the evaluation ID including a masked portion indicating out of the evaluation range; and
a comparator which compares the task ID including the masked portion with the evaluation ID including the masked portion to generate the signal.

3. The processor system according to claim 1,
wherein the mask value comprises a value indicating that an evaluation target includes the group ID, and
wherein the matching unit compares the group ID of the task ID with the group ID of the evaluation ID to generate the signal.

4. The processor system according to claim 1,
wherein the mask value comprises a value indicating that an evaluation target includes the individual ID, and
wherein the matching unit compares the individual ID of the task ID with the individual ID of the evaluation ID to generate the signal.

5. The processor system according to claim 1,
wherein the mask value comprises a first value indicating that an evaluation target includes the resource field, and
wherein the matching unit compares at least a portion of the resource field of the task ID with a portion of the resource field of the evaluation ID to generate the signal.

6. The processor system according to claim 1,
wherein the task executed in the processor comprises a common task, the common task being commonly called from a plurality of tasks which belong to different task groups, and
wherein, if the common task is executed in the processor, the first memory stores the task ID including the task group ID of a task which is a caller of the common task as the task group ID of the common task.

7. A processor system comprising:
a processor which executes a plurality of tasks by switching to one another;
a first memory which stores a task ID identifying a task executed in the processor, the task ID including a first task collection information indicating a collection of tasks to which the task executed in the processor belongs;
a second memory which stores an evaluation ID identifying a task of a measurement target, the evaluation ID including a second task collection information indicating a collection of tasks to which the task of a measurement target belongs;
a third memory which stores a mask value;
a matching unit which receives the task ID, the evaluation ID and the mask value, and which compares at least a portion of the first task collection information with a portion of the second task collection information based on the mask value to generate a signal; and
a counter which counts in response to the signal.

8. The processor system according to claim 7,
wherein the matching unit comprises:
a first selector which receives the first task collection information and the mask value to specify the portion of the first task collection information to be compared with the portion of the second task collection information based on the mask value;
a second selector which receives the second task collection information and the mask value to specify the portion of the second task collection information to be compared with the portion of the first task collection information based on the mask value; and
a comparator which compares the portion of the first task collection information specified by the first selector with the portion of the second task collection information specified by the second selector to output the signal.

9. The processor system according to claim 7,
wherein the task ID further includes a first individual ID information distinguishing each task in the collection of the tasks to which the task executed in the processor belongs,
wherein the evaluation ID further includes a second individual ID information distinguishing each task in the collection of the tasks to which the task of the measurement ta•get belongs, and
wherein the matching unit comprises:
a first selector which receives the task ID and the mask value to select one of the first task collection information and the first individual ID based on the mask value;
a second selector which receives the task ID and mask value to select one of the second task collection information and the second individual ID based on the mask value; and
a comparator which compares the portion of the first task collection information with the portion of the second task collection information or compares the first individual ID with the second individual ID based on results of selecting in the first and second selectors.

10. The processor system according to claim 9,
wherein, if the first task collection information is selected, the first selector specifies the portion of the first task collection information based on the mask value, and
wherein, if the second task collection information is selected, the second selector specifies the portion of the second task collection information based on the mask value.

* * * * *